United States Patent [19]

Ching

[11] Patent Number: 5,772,351
[45] Date of Patent: Jun. 30, 1998

[54] PIVOT JOINT

[75] Inventor: Fu-Gen Ching, Pan Chiao City, Taiwan

[73] Assignee: Chih Ching Industry Ltd., Taipei Hsien, Taiwan

[21] Appl. No.: 743,489

[22] Filed: Nov. 4, 1996

Related U.S. Application Data

[63] Continuation-in-part of Ser. No. 379,199, Jan. 24, 1995, abandoned.

[51] Int. Cl.$^6$ .................................................. F16C 11/00
[52] U.S. Cl. ........................... 403/111; 16/337; 16/340; 248/292.13; 248/922; 361/682; 403/84; 403/103
[58] Field of Search ............................ 16/337, 338, 339, 16/340, 341; 248/291.1, 292.13, 920, 922; 361/681, 682; 403/70, 71, 84, 91, 101, 103, 111

[56] References Cited

U.S. PATENT DOCUMENTS

| | | | |
|---|---|---|---|
| 3,058,795 | 10/1962 | Siegal et al. .......................... | 16/337 X |
| 3,908,514 | 9/1975 | Rist ....................................... | 91/391 R |
| 4,018,104 | 4/1977 | Bland et al. .............................. | 16/340 |
| 4,392,686 | 7/1983 | Beer ..................................... | 16/377 X |
| 4,703,613 | 11/1987 | Raymond ................................ | 56/12.7 |
| 4,829,633 | 5/1989 | Kassner ................................ | 16/340 X |
| 5,081,742 | 1/1992 | Kobayashi .............................. | 16/337 |
| 5,208,944 | 5/1993 | Lu ....................................... | 16/340 X |
| 5,269,047 | 12/1993 | Lu ........................................... | 16/340 |

*Primary Examiner*—Brian K. Green
*Assistant Examiner*—Andrea Chop
*Attorney, Agent, or Firm*—Rosenberg, Klein, & Bilker

[57] ABSTRACT

A pivot joint including a mounting frame, a pivot bolt inserted through a hole on the mounting frame, and a lock nut screwed up with the pivot bolt to hold the mounting frame and the pivot bolt together, permitting the pivot bolt to be turned about its longitudinal center axis, wherein the pivot bolt has a collar stopped against the mounting frame at one side opposite to the lock nut; two washers are mounted around the pivot bolt and retained between the mounting frame and the lock nut; a plurality of corrugated plate springs are mounted around the pivot bolt and retained between the washers.

2 Claims, 4 Drawing Sheets

5,772,351

1

PIVOT JOINT

This is a Continuation-in-Part Application of application Ser. No. 08/379,199, filed 24 Jan. 1995 now abandoned.

BACKGROUND OF THE INVENTION

The present invention relates to a pivot joint for connection between the display unit of a mobile computer and the mainframe and keyboard unit thereof. The pivot joint uses a plurality of corrugated plate springs to ensure the positive positioning of the pivot bolt after an adjustment, and to prolong the service life of the device.

FIG. 1 shows a pivot joint according to the prior art for connection between the display unit of a mobile (notebook) computer and the mainframe and keyboard unit thereof. This structure of pivot joint comprises a mounting frame 100 for fastening to the mainframe and keyboard unit, a pivot bolt 200 for fastening to the display unit, a lock nut 600 for connection to the threaded front end of the pivot bolt 200 to hold the pivot bolt 200 and the mounting frame 100 together, two packing rings 500 and 500a mounted around the pivot bolt 200 and stopped against the mounting frame 100 at two opposite sides, a plurality of dish-like plate springs 300 mounted around the pivot bolt 200 and retained between one packing ring 500a and the lock nut 600, and a locating plate 400 mounted around the pivot bolt 200 and retained between the disk-like plate springs 300 and the lock nut 600 and having a projecting rod 401. The mounting frame 1100 has a pivot hole 101, which receives the pivot bolt 200, and a plurality of notches 1010 around the pivot hole 101. The packing rings 500 and 500a have a plurality of lubricating holes 501. This structure of pivot joint has drawbacks. The threaded front end of the pivot bolt 200 is made flat and inserted into a rectangular hole on the locating plate 400 so that the pivot bolt 200 and the locating plate 400 cannot be turned relative to each other. Another drawback of this structure of pivot joint is that the processing of the notches 1010 on the mounting frame 100 around the pivot hole 101 and the lubricating holes 501 on the packing rings 500 and 500a, which are made for filling a lubricating oil, complicates the manufacturing procedure of the mounting frame 100 and the packing rings 500 and 500a, and also greatly increases their manufacturing cost. Another drawback of this structure of pivot joint is that the broad friction surface area among the parts will cause the parts to wear away quickly with use. When the parts of the pivot joint have begun to wear, the pivot bolt becomes unstable to be positioned freely as desired. Still another drawback of this structure of pivot joint is that a lubricating oil must be regularly applied to the parts of the pivot joint so that the parts of the pivot joint can work smoothly. However, the result of the application of a lubricating oil to the parts of the pivot is still not satisfactory because the lubricating oil will become dried quickly when it is disposed in contact with air. Furthermore, the projecting rod 401 of the locating plate 400 is to limit the turning angle of the pivot bolt 200 relative to the mounting frame 100. However, the formation of the projecting rod 401 on the locating plate 400 complicates the manufacturing process of the locating plate 400.

SUMMARY OF THE INVENTION

The present invention has been accomplished under the circumstances in view. It is one object of the present invention to provide a pivot joint which does not wear away with use quickly. It is another object of the present invention to provide a pivot joint which can be firmly retained in any desired angular position. It is still another object of the present invention to provide a pivot joint which is smooth and stable in use without the need of the application of a lubricating oil. It is still another object of the present invention to provide a pivot joint which is inexpensive to manufacture.

According to one aspect of the present invention, the pivot joint comprises a mounting frame, a pivot bolt inserted through a pivot hole on the mounting frame, a lock nut screwed up with pivot bolt to hold the mounting frame and the pivot bolt together, permitting them to be turned relative to each other, two washers mounted around the pivot bolt and retained between the mounting frame and the lock nut, and a plurality of corrugated plate springs are mounted around the pivot bolt and retained between the washers, wherein the pivot bolt has a collar stopped against the mounting frame at one side opposite to the lock nut.

According to another aspect of the present invention, the outer diameters of the washers are made gradually smaller toward the collar of the pivot bolt, and the outer diameter of the collar of the pivot bolt is made gradually smaller toward to the washers, and therefore the friction area among the parts is relatively reduced.

DETAILED DESCRIPTION OF THE PREFERRED EMBODIMENT

Figure 1:
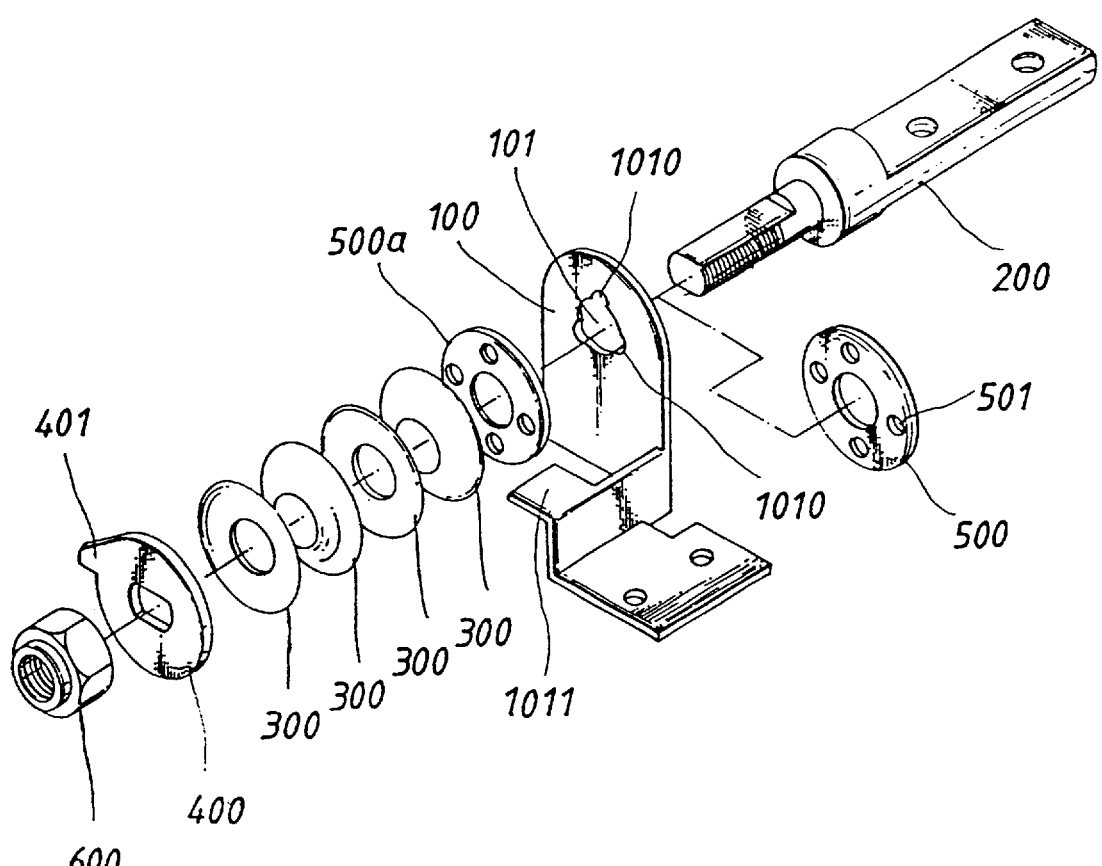
FIG. 1 is an exploded view of a pivot joint according to the prior art.
Figure 2:
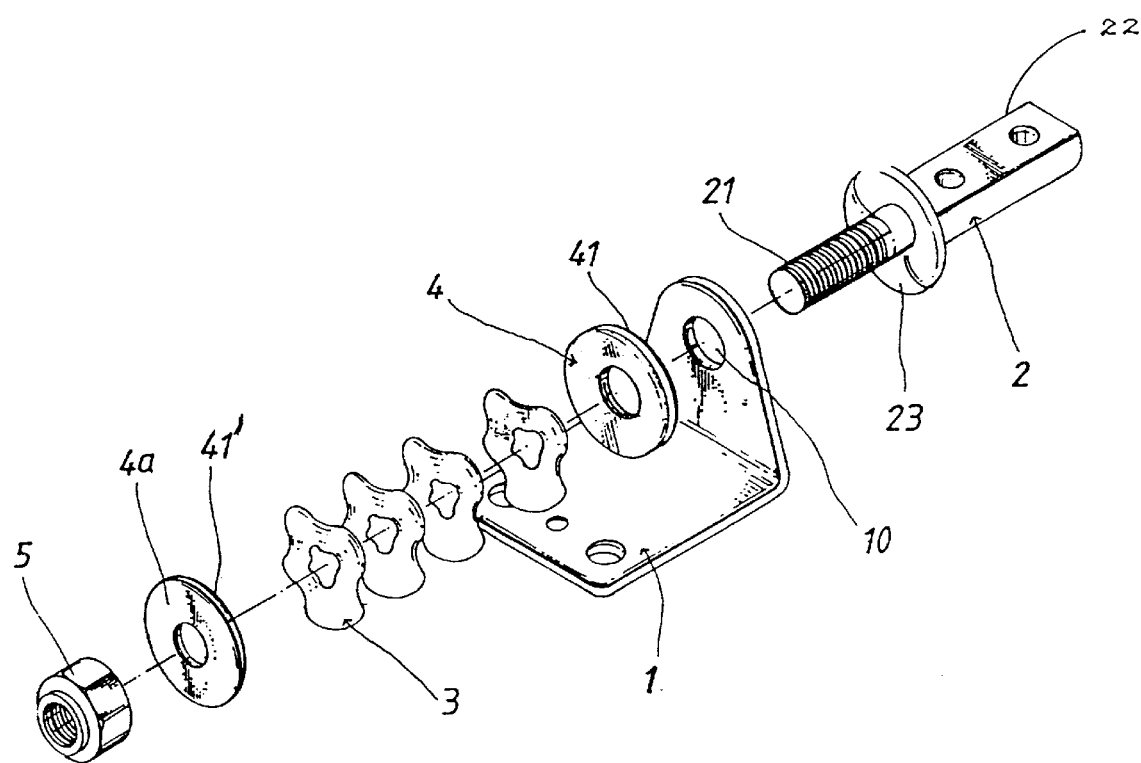
FIG. 2 is an exploded view of a pivot joint according to the preferred embodiment of the present invention.

Referring to FIG. 2, a pivot joint in accordance with the present invention is generally comprised of a L-shaped mounting frame 1 for fastening to the mainframe and keyboard unit of a mobile computer, a pivot bolt 2 for fastening to the display unit of the mobile computer, a plurality of corrugated plate springs 3 for mounting around the pivot bolt 2, a lock nut 5 for connection to the pivot bolt 2, two washers 4 and 4a for mounting around the pivot bolt 2 between the L-shaped mounting frame 1 and the lock nut 5.

Figure 5:
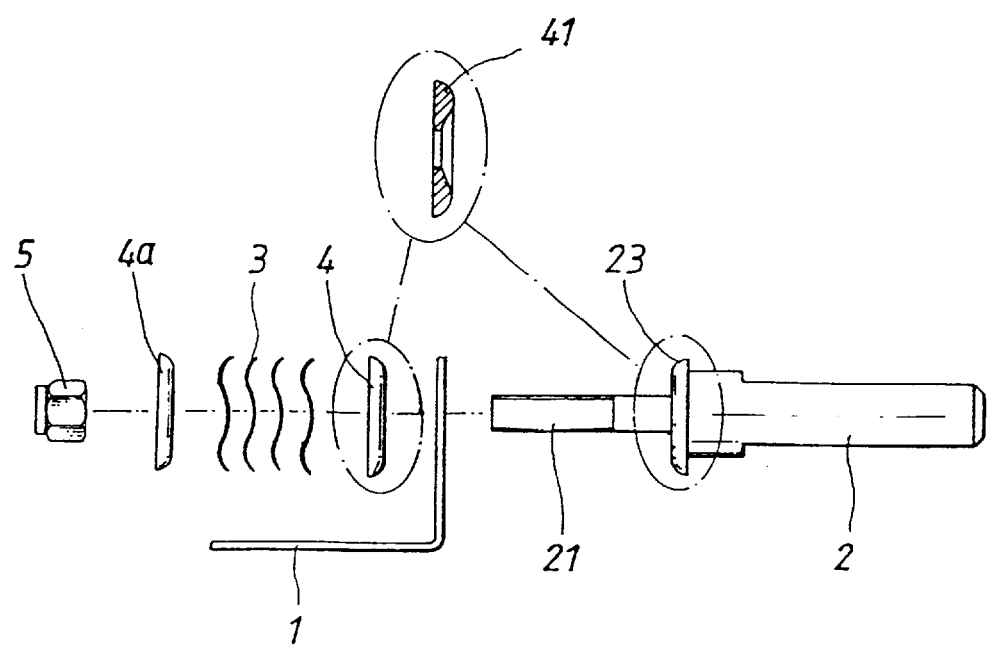
FIG. 5 is a plain view of FIG. 2.

Referring to FIG. 5 and FIG. 2 again, the pivot bolt 2 has a flat mounting rod section 22 at one end for fastening to the display unit of a mobile computer (not shown), a screw rod section 21 at an opposite end, and a collar 23 between the flat mounting rod section 22 and the screw rod section 21. The L-shaped mounting frame 1 is for fastening to the mainframe and keyboard unit of the mobile computer, having a pivot hole 10 at one end. The corrugated plate springs 3 have each both sides corrugated. The washers 4 and 4a have the respective peripheries 41 and 41' tapered, i.e., the outer diameters of the washers 4 and 4a are made gradually smaller in one direction. Similar to the washers 4 and 4a, the periphery of the collar 23 of the pivot bolt 2 is tapered. Furthermore, the corrugated plate springs 3 have each both sides corrugated and formed into four folds or furrows.

Figure 3:
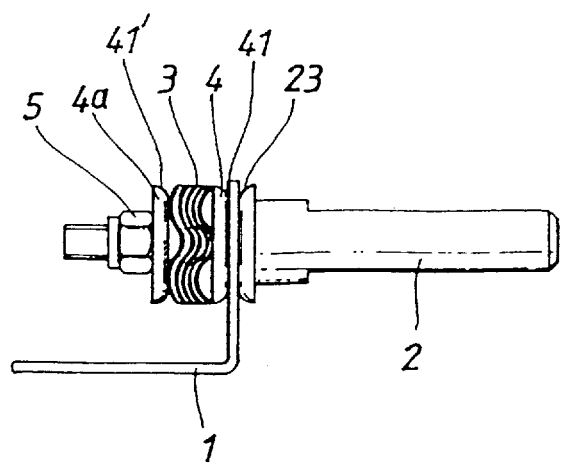
FIG. 3 is a plain assembly view of the pivot joint of the preferred embodiment of the present invention.

Referring to FIG. 3, the screw rod section 21 of the pivot bolt 2 is inserted through the hole 10 on the L-shaped mounting frame 1, the washer 4, the corrugated plate springs 3 and the washer 4a, and then screwed up with the lock nut 5. When installed, the collar 23 of the pivot bolt 2 and the washer 4 are stopped against the pivot hole 10 of the L-shaped mounting frame 1 at two opposite sides with their tapered peripheries disposed sloping toward each other, and the corrugated plate springs 3 are side matched one another and retained between the washers 4 and 4a.

Figure 4:
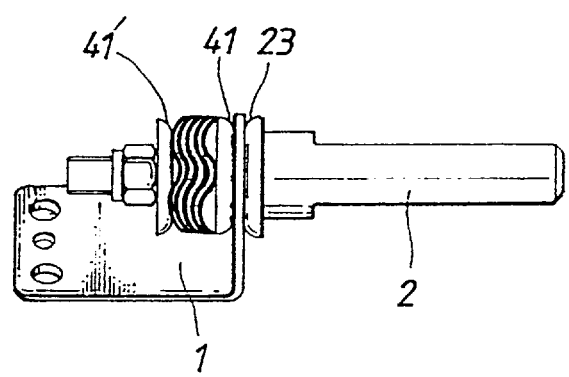
FIG. 4 is similar to FIG. 3 but showing the pivot bolt turned relative to the L-shaped mounting frame.

Referring to FIG. 4, when the pivot bolt 2 is turned relative to the L-shaped mounting frame 1, the corrugated plate springs 3 are pressed to contact together with the washers 4 and 4a and not turned with the pivot bolt 2. The pivot bolt 2 can be rotated and retained in any desired angular position relative to the L-shaped mounting frame 1.

What is claimed is:

1. A pivot joint having a mounting frame, a pivot bolt inserted through a hole on said mounting frame, and a lock nut threadedly engaged with said pivot bolt to hold said mounting frame and said pivot bolt together, permitting said pivot bolt to be turned about its longitudinal center axis, wherein said pivot bolt has a collar stopped against said mounting frame at one side opposite to said lock nut; two washers are mounted around said pivot bolt and retained between said mounting frame and said lock nut; a plurality of corrugated plate springs are mounted around said pivot bolt and retained between said washers; and said collar of said pivot bolt having an outer diameter that becomes gradually smaller toward said washers and said corrugated plate springs.

2. The pivot joint of claim 1 wherein the outer diameter of said two washers becomes gradually smaller toward said collar of said pivot bolt.

* * * * *